(12) United States Patent
Meister et al.

(10) Patent No.: US 7,792,907 B2
(45) Date of Patent: Sep. 7, 2010

(54) E-MAIL SYSTEM WITH USER SEND AUTHORIZATION

(76) Inventors: Mark Meister, 9113 Wooden Bridge Rd., Potomac, MD (US) 20854; James Randall Beckers, 14600 Crossway Rd., Rockville, MD (US) 20853

(*) Notice: Subject to any disclaimer, the term of this patent is extended or adjusted under 35 U.S.C. 154(b) by 589 days.

(21) Appl. No.: 10/715,408

(22) Filed: Nov. 19, 2003

(65) Prior Publication Data

US 2004/0103162 A1    May 27, 2004

Related U.S. Application Data

(63) Continuation of application No. 09/337,035, filed on Jun. 28, 1999, now Pat. No. 6,671,718.

(51) Int. Cl.
*G06F 15/16* (2006.01)
(52) U.S. Cl. .................. 709/206; 709/201; 709/203
(58) Field of Classification Search ............. 709/206, 709/201, 203
See application file for complete search history.

(56) References Cited

U.S. PATENT DOCUMENTS

| | | | |
|---|---|---|---|
| 5,017,917 A | 5/1991 | Fisher et al. | |
| 5,125,075 A | 6/1992 | Goodale et al. | |
| 5,283,856 A | 2/1994 | Gross et al. | |
| 5,311,591 A * | 5/1994 | Fischer | 713/156 |
| 5,555,346 A | 9/1996 | Gross et al. | |
| 5,555,426 A | 9/1996 | Johnson et al. | |
| 5,557,723 A | 9/1996 | Holt et al. | |
| 5,632,018 A | 5/1997 | Otorii | |
| 5,694,616 A | 12/1997 | Johnson et al. | |
| 5,742,769 A | 4/1998 | Lee et al. | |
| 5,796,948 A | 8/1998 | Cohen | |
| 5,870,548 A | 2/1999 | Nielsen | |
| 5,878,230 A | 3/1999 | Weber et al. | |
| 6,023,723 A | 2/2000 | McCormick et al. | |
| 6,047,310 A | 4/2000 | Kamakura et al. | |
| 6,067,101 A | 5/2000 | Arakawa et al. | |
| 6,073,133 A | 6/2000 | Chrabaszcz | |
| 6,073,165 A | 6/2000 | Narasimhan | |
| 6,108,691 A | 8/2000 | Lee et al. | |
| 6,112,227 A | 8/2000 | Heiner | |
| 6,185,603 B1 | 2/2001 | Henderson et al. | |
| 6,192,407 B1 | 2/2001 | Smith et al. | |
| 6,212,551 B1 | 4/2001 | Asghar et al. | |

(Continued)

OTHER PUBLICATIONS

"Advanced Mail List Verify", E-Mail Management Software, Nov. 12, 1999, 1 pg.

(Continued)

*Primary Examiner*—Krisna Lim
(74) *Attorney, Agent, or Firm*—Sterne, Kessler, Goldstein & Fox P.L.L.C.

(57) ABSTRACT

A system that monitors for an initiation of the sending of an electronic message. The user is alerted or warned that the message is about to be sent. The alert includes a list of the addressees of the message. The list includes addressee aliases where available. The sender can then verify that the addressees are correct and change or delete those on the list, or erase the message. The system also provides such an alert when a computer initiates the sending of an unauthorized message and allows the user to delete the unauthorized message.

44 Claims, 6 Drawing Sheets

U.S. PATENT DOCUMENTS

| | | |
|---|---|---|
| 6,212,553 B1 | 4/2001 | Lee et al. |
| 6,230,156 B1 | 5/2001 | Hussey |
| 6,230,186 B1 | 5/2001 | Yaker |
| 6,249,808 B1 | 6/2001 | Seshadri |
| 6,266,692 B1 | 7/2001 | Greenstein |
| 6,330,590 B1 | 12/2001 | Cotton |
| 6,332,164 B1 | 12/2001 | Jain |
| 6,334,142 B1 | 12/2001 | Newton et al. |
| 6,360,221 B1 | 3/2002 | Gough et al. |
| 6,360,251 B1 | 3/2002 | Fujita et al. |
| 6,405,225 B1 | 6/2002 | Apfel et al. |
| 6,405,243 B1 | 6/2002 | Nielsen |
| 6,427,164 B1 | 7/2002 | Reilly |
| 6,434,601 B1 | 8/2002 | Rollins |
| 6,453,338 B1 | 9/2002 | Shiono |
| 6,460,074 B1 | 10/2002 | Fishkin |
| 2001/0044828 A1 | 11/2001 | Kikinis |

OTHER PUBLICATIONS

"Advanced Direct Remailer", E-Mail Management Software, Nov. 12, 1999, 1 pg.
"Outlook 98 Update: E-mail Security," www.microsoft.com/downloads/details.aspx?familyid=48B0BC6A-B123-4F48-B27D-119078B4819F&displaylang=en.
"Confirm on send" Examples.
http://www.nautilusone.net/documentation/documents/UserG.pdf, Feb. 8, 2007.
mozdev.org—enigmail.com: userprefs, Jun. 26, 2007.
mozdev.org—enigmail.com: configure, Jun. 26, 2007.
kmail.pdf.
SAP library—Development Manual.
.mozdev-fries.
ABOUT.JS.
Taxsoftware.com.
Intellectual Property Licensing Prospectus, Fred Cohen & Associates.
BlackBerry Enterprise Solution Security, Release 4.1.2.
F. Cohen, Meeting the content control challenge: Techniques, Tools, and Architectures.
A. Parsons, Best Practices for BlackBerry Administrators, Research In Motion.
TAXSOFTWARE.COM User Manual.
http://www.taxsoftware.com/user_manual.htm.
AMOSMail User's Guide, Version 5.0.
WildPalm Ltd., SMSTray v1.0.1.
D. Naber et al., The KMail Handbook.
"Advanced Mail List Verify", E-Mail Management Software, Nov. 12, 1999 1 pg.
"Advanced Direct Remailer", E-Mail Management Software, Nov. 12, 1999 1 pg.
Microsoft Corporation, "Outlook 2000 SR-1 Update: E-Mail Security" [online], 7 pages, 2000, Retrieved from: http://officeupdate.microsoft.com/2000/downloadDetails/out2ksec.htm [Retrieved on: Mar. 25, 2008.
"Pine Technical Notes—Version 4.01" Jul. 1998. (See also http://pine.site2nd.org/pine/old/).
Brotz, Douglas K., "Message system mores: etiquette in Laurel", ACM Transactions on Information Systems (TOIS), Apr. 1983, vol. 1, Issue 2, pp. 179-192.
Rosenberg et al., "An Overview of the Andrew Message System", Applications, Technologies, Architectures, and Protocols for Computer Communication Proceedings of the ACM workshop on Frontiers in computer communications technology, 1987, pp. 99-108.
Marx et al. "MailCall: message presentation and navigation in a nonvisual environment", Conference on Human Factors in Computing Systems Proceedings of the SIGCHI conference on Human factors in computing systems: common ground, 1996, pp. 165-172.
Bass et al., "E-mail bombs and countermeasures: cyber attacks on availability and brand integrity", Network, IEEE, Mar./Apr. 1998, vol. 12, Issue 2, pp. 10-17.

* cited by examiner

From: bill@company.com
To: george@company.com
Cc: susan@company.com, benefits, payroll, marketing@competition.com
Subject: merger meeting George- Our meeting has been postponed until 1 PM.

Bill

E-MAIL SYSTEM WITH USER SEND AUTHORIZATION

CROSS-REFERENCE TO RELATED APPLICATIONS

This application is related to and is a continuation and claims priority to U.S. application entitled Email Client Application Incorporating An Active Transmit Authorization Request having Ser. No. 09/337,035, by Meister et al, filed Jun. 28, 1999 now U.S. Pat. No. 6,671,718 and incorporated by reference herein.

BACKGROUND OF THE INVENTION

1. Field of the Invention

The present invention is directed to a system that alerts or warns a user of an electronic mail system as to the addressees of a message before the message is sent, after the user indicates that the message is to be sent, and allows the sender to revise the list of addressees or cancel the sending entirely.

2. Description of the Related Art

A person who receives electronic mail (e-mail) often receives a message as one of many recipients. When the individual or e-mail system user responds or replies to the message, often the user may select an option that replies to the sender and sends copies of the reply to all of the recipients of the original message. This selection is often made before the user has composed the reply. It can be the case that the user replies with comments about one of the recipients, not consciously intending that a copy be sent to that particular recipient. Once the user has finished the message the user initiates sending the message to all of the addresses at once, including sending the message to the unintended addressee. This often causes discord between the user and the unintended recipient who erroneously received the message.

A similar situation can occur when addressees of a message are being selected from an address book or list. The user, when selecting the recipients, may inadvertently select ("click-on") an addressee next to the intended recipient in the list creating a situation where a message is erroneously addressed.

Sending a message to multiple recipients using a single mailing list name is another example of how e-mail might be mistakenly directed. For example, a sender wants to e-mail a group and is thinking about the regular members as the message is written. The sender forgets that a substitute member is also on the list, or the list may be out of the sender's control and unknown to the sender the list has been modified to include an additional member, and the sender writes something about the individual or substitute member and sends the message.

In addressing an e-mail, a user often refers to a recipient by a nickname or alias. When two or more aliases are similar, for example when potential addressees (i.e., address book entries) have the same last name, the user may inadvertently address an email to the similar addressee.

What is needed is a system that will alert the user to addressees of a message after it has been composed but before it is sent that will allow the user to change the list of addressees or to edit the message considering the list of addressees.

Often e-mail is improperly addressed because of the haste with which a sender formulates an address. Ultimately, such mail will be returned after some period of time. The impact of this mistake is hardest felt when time is of the essence.

What is needed is a system that will recognize or detect and alert the user to incomplete or improper addresses before a message is sent and allow the user to correct the addresses.

Today computer viruses can compose and send e-mail without a user being aware of the transmission of such unauthorized e-mail.

What is needed is a system that will alert a user when an unauthorized e-mail is being sent by the users system and allow the user to cancel the message before it is sent.

SUMMARY OF THE INVENTION

It is an object of the present invention to provide an e-mail system that alerts a user to the addressees of an e-mail message before it is sent.

It is another object of the present invention to allow a user to modify a list of addressees of an e-mail message before the message is sent and after the addressee list is originally created.

It is also an object of the present invention to alert a user when an unauthorized e-mail message is being sent.

It is a further object of the present invention to determine whether an addressee's address is properly entered and to alert the user in the case of a potentially undeliverable message prior to sending.

The above objects can be attained by a system that alerts the sender with a list of the addressees of an e-mail message before the message is sent. The sender can then verify that the addressees are correct or change or delete those on the list. The system also provides such an alert prior to sending an unauthorized message and allows the user to delete the unauthorized message.

In one aspect, the present application relates to an e-mail method comprising recognizing whether an electronic mail message is to be sent and alerting a system user as to the message being sent, wherein the recognizing process recognizes a send operation initiated by an unauthorized agent.

In another aspect, the present application relates to an electronic mail method comprising recognizing that a message is to be sent by an unauthorized agent, and alerting the user.

In another aspect, the present application relates to an e-mail method comprising recognizing whether an electronic mail message is to be sent by a user or an unauthorized agent, and alerting the user as to the message being sent. The method may include alerting the user as to addressees of the message by providing a display of both alias names and fully resolved addresses when available, and a confirmation field for each address, allowing the user to approve sending of the message to an addressee after the alert by marking the confirmation field, allowing the user to modify an addressee list after the alert, allowing the user to erase the message, or sending the message after all addressees have been approved.

In another aspect, the present application relates to an electronic mail method comprising determining whether an electronic mail message is to be sent by detecting a send operation initiated by the user or detecting a send operation initiated by an unauthorized agent, and alerting an e-mail system user as to addressees of the message by providing a display of both available alias names and fully resolved addresses and a confirmation field for each intended recipient. The method further may include allowing the user to modify an addressee list after the alert with the alert being again produced after the intended recipient list is modified, allowing the user to approve sending of the message after the alert, or sending the message after approval.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 illustrates the structure of a typical e-mail message.

DETAILED DESCRIPTION OF THE PREFERRED EMBODIMENTS

The present invention is directed to a system that includes an electronic mail (e-mail) alert system which reduces the possibility of inadvertently sending an e-mail message to an unintended recipient and allows the user to intercept and stop unauthorized e-mail from being sent by the user's computer. The present invention modifies the operation of a conventional e-mail system (or computer-user to computer user or other network communication device to computer-user messaging system or other network communication device) to alert the user before messages are sent and allows the user to change the recipients or cancel the message.

Figure 1:
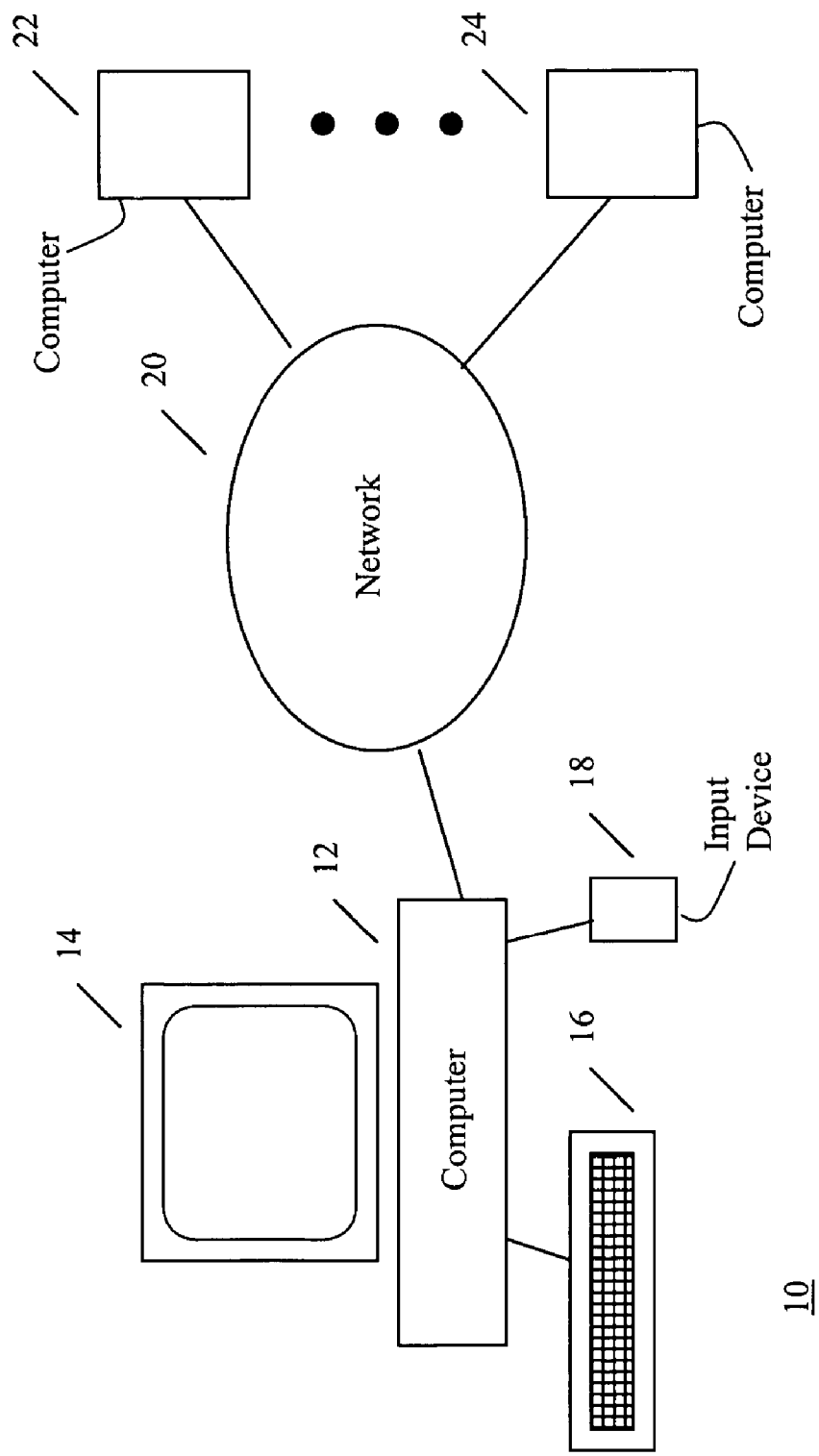
FIG. 1 illustrates typical hardware components of a system used by the present invention.

The present invention is designed to operate in an environment in which a user of an electronic mail (e-mail) system has access to a typical computer system 10, as depicted in FIG. 1, such as a desktop computer system including a computer 12 which executes an e-mail client application, a display 14 on which e-mail messages are viewed in application windows, a keyboard 16 used to compose e-mail messages and an input device 18, such as a mouse, used to activate controls (buttons) in the e-mail system. The computer 12 includes a modem or network interface that allows the computer to connect to a transmission network 20, such as a corporate or enterprise network, the Internet or any other computer or communications network, allowing the user to send messages to and receive messages from other computers 22 and 24 (or other network communication devices) connected to the network. The computer also includes storage, such as RAM, ROM, magnetic disk, optical disk, etc., suitable for storing and distribution of the processes and displays described herein. The invention can also be distributed via downloading over a network or otherwise.

Figure 2:
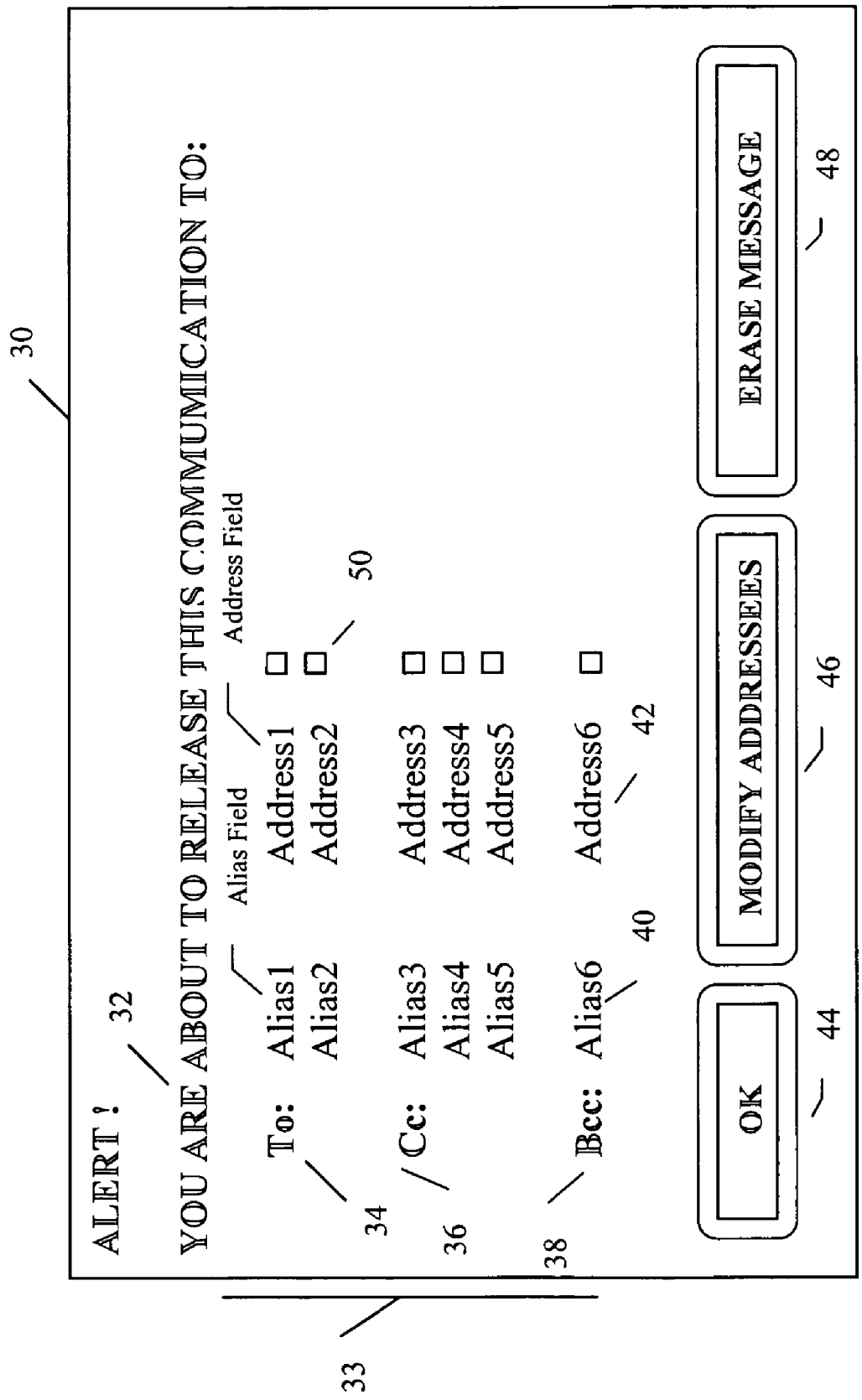
FIG. 2 depicts a dialog box according to the present invention.

When a user has composed a message and requested that the message be sent (for example, by activating a send control—button—on the e-mail application's graphical user interface (GUI) displayed on the display 14 by the e-mail program executing in the computer 12), or an unauthorized message is about to be sent, the present invention alerts the user by popping-up or displaying a dialog box 30, such as depicted in FIG. 2, or activating another type of alert such as an icon, sound, verbal cue, etc. The alert need not be limited to the type shown in FIG. 2, which is offered an example only. The dialog box 30 includes text 32 which indicates to the user that the user is about to send a message to the listed individuals.

The dialog box 30 can provide a simple list of the message recipients or addressees using the network addresses. More preferably, the dialog box 30 provides a list 33 of the recipients divided according to their addressee status in sections "To"—34, "cc"—36, and "bcc"—38, etc. Each of the entries in the list 33 preferably includes an alias field 40 in which the user's alias name of the recipient is provided, if available. An alias is the name that the user includes in the user's address book for a particular addressee. A resolved address field 42 is also preferably provided. A fully resolved address is an address on which the mail server can base message delivery (i.e., no further translation is required by the client application).

The dialog box 30 also includes an "OK" control or button 44 that allows the user to approve or send the message to the recipients on the list. When this control 44 is activated, the message is sent immediately or placed in a send queue (or out-box) to be sent in accordance with the application's preset configuration. A "Modify Addressees" control 46 is also provided that allows the user to modify the recipients of the message. Activating this control 46 allows the user to edit the list 33 removing any unintended recipients. The recipients removed from the message list 33 are removed from the message header. An "Erase" control 48 is also provided that causes the message to be deleted. Another control (not shown) can be provided that allows the user to modify the text of the message. Activating this text modification control would return the message to the e-mail system at the compose stage and allow the user to remove any text before the message is sent.

The dialog box 30 can optionally include a confirmation box or field 50 corresponding to each entry on the list 33. The confirmation box is marked by the user to confirm that the particular recipient is intended. When the send control 44 is activated, within this option, the system checks to see if all of the confirmation boxes 50 have been checked, provides an overlay dialog box that all confirmation boxes must be marked before the message is sent if all have not been marked and will not send the message until all the confirmation boxes are marked. Alternatively, it will generate a new list without those names marked and the dialog box 30 with the alert will appear again. The invention is not limited to these scenarios. They are offered as examples of how the addressee list can be confirmed.

A typical Internet text e-mail message, as depicted in FIG. 3, is comprised of header fields 62 and a body 64. The header fields 62 are separated from the message body by a null (blank) line. Each header field is comprised of a field name (e.g., To, From, Cc, etc.) and a field body (e.g., mailbox address.) Field names and field bodies are separated by a colon (":"). A field body is terminated by a carriage return/line feed. Lines used to continue header fields 62 begin with a space or tab. Addresses in field bodies are separated by commas (","). Some header field bodies are interpreted or parsed simply as free text, for example, the field body of a "Subject:" field.

Figure 4:
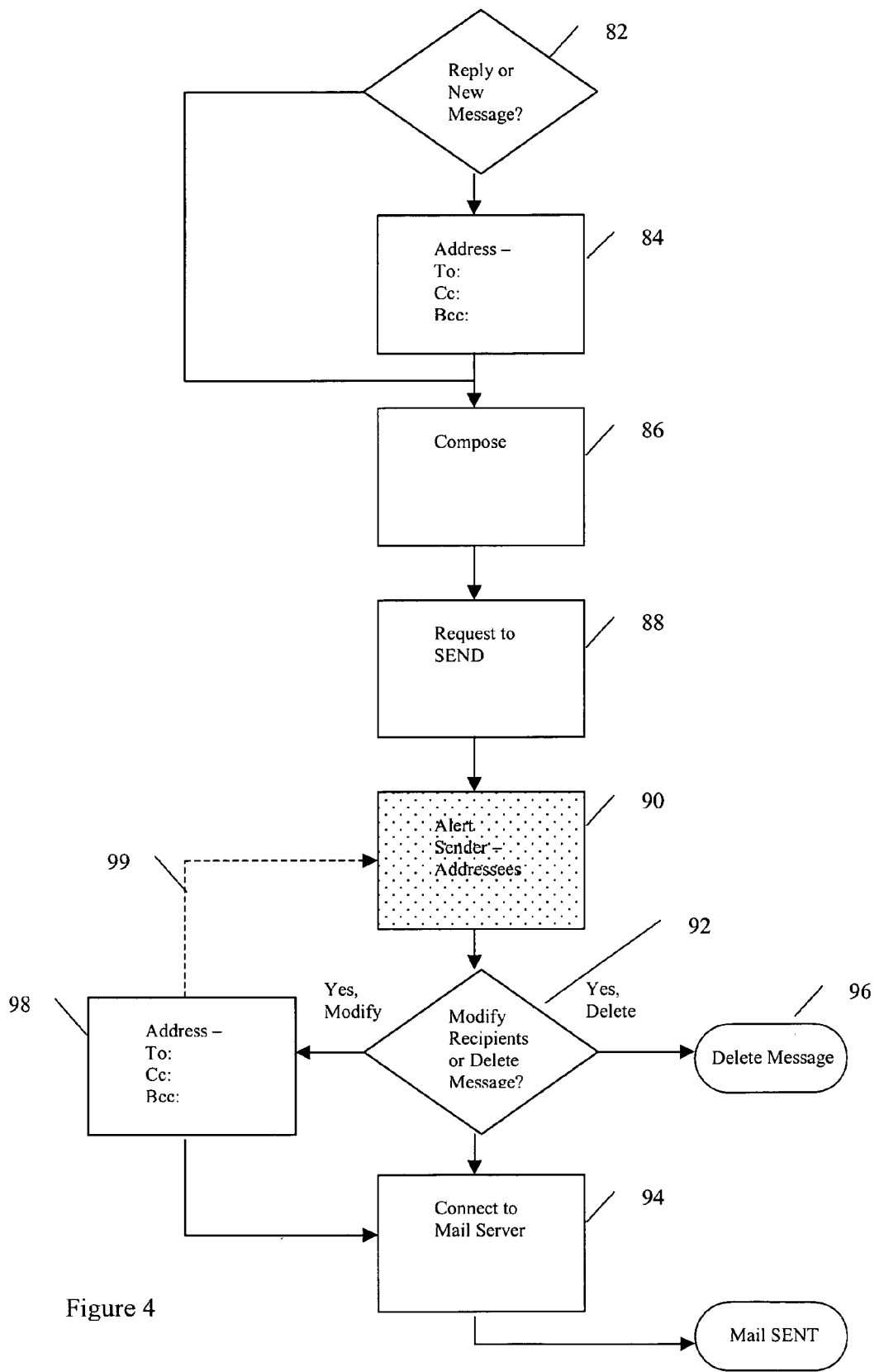
FIG. 4 depicts the process of the present invention.

The process of the present invention is inserted into a conventional e-mail process. The system when alerting the user to recipients of messages created by the user, as depicted in FIG. 4, first determines 82 whether the message is a reply or a new message. If the message is a new message, the user provides recipient addresses 84 for the message by entering new addresses, selecting addresses from an address book, copying addresses from other sources, etc. The user then composes 86 the message. The user can also add additional recipients to the message during the composition operation by returning to the address entry operation.

Figure 5:
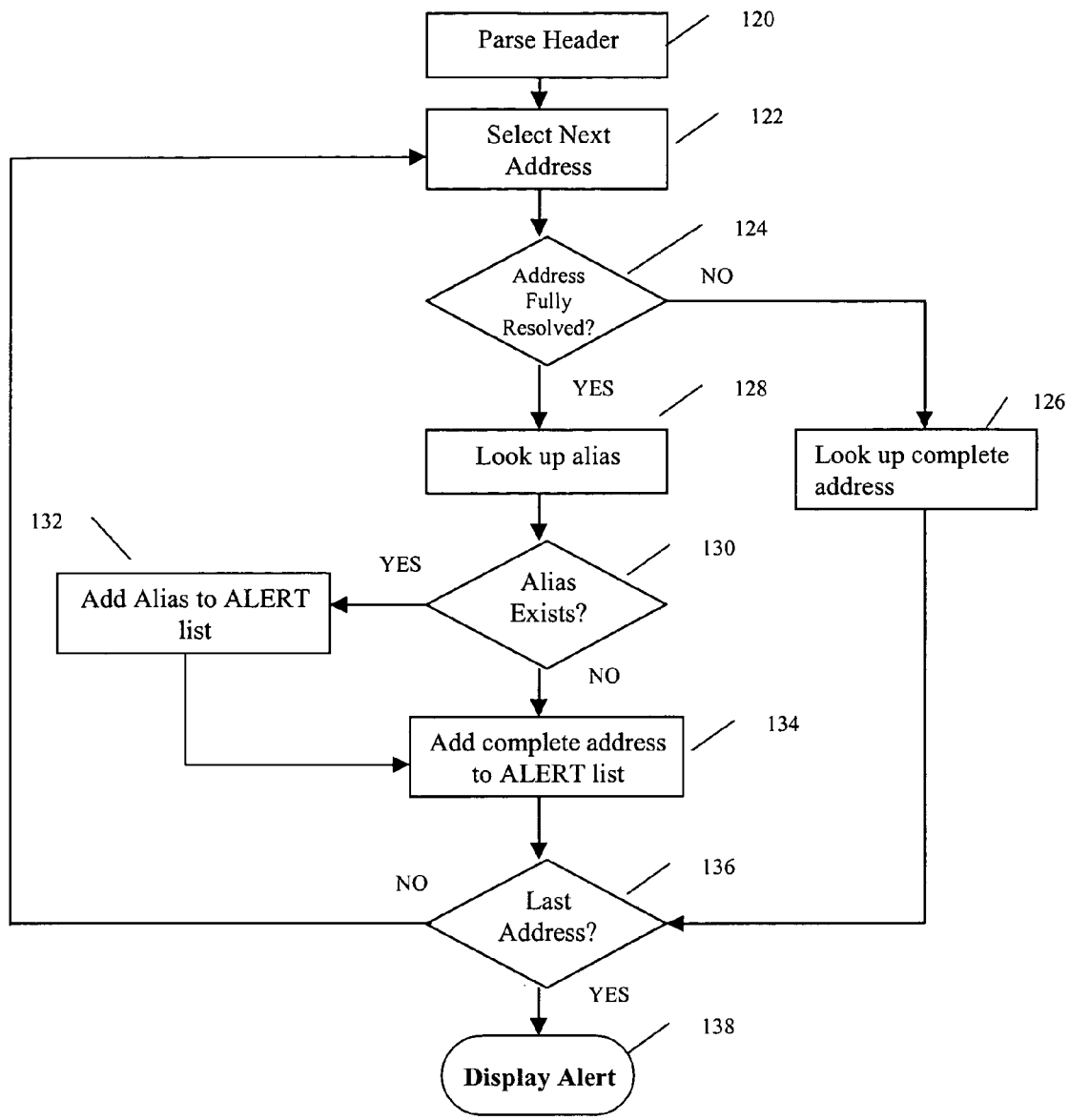
FIG. 5 illustrates the flow of the dialog box completion process.

When the message is finished, the user activates a send control (button) requesting 88 that the system send the message. Prior to sending the message (that is, prior to making a connection to the mail server application) the system, in accordance with the invention, recognizes that the message is to be sent and the system displays the dialog box 30 of FIG. 2, or similar alert, to alert 90 the user that a message is about to be sent and to indicate to the user the addressees of the message. The operations in the alert 90 associated with completing the fields 40 and 42 of the list 33 will be discussed in more detail with respect to FIG. 5. The system then awaits 92 a selection of one of the controls 44, 46 or 48. If the "OK" control 44 is selected, the message is queued to be sent or sent 94, however configured by the user. If the Erase control 48 is selected, the message is deleted 96. If the "Modify Addressees" control 46 is activated, the system allows the user to modify 98 the list of recipients which operation is discussed in more detail in FIG. 6. Once the modify operation is completed, the message is sent 94. Alternatively, as depicted by the dashed line 99, the system can return to the operation 90 of presenting the alert dialog box and not send the message until the send control 44 is activated.

When creating the entries of the list 33, the system parses 120 (see FIG. 5) the header to identify each of the addresses of the recipients. An address is then selected 122, such as the first or last address in the header. The system determines 124 whether the selected address requires local resolution. An example is a local (i.e., this client) alias. In this case, the system retrieves 126 from the user's electronic address book, the address sufficient for the mail server(s) to make delivery. A typical address book has a structure such as set forth Table 1 below where locally resolved addresses (e.g., aliases and groups or lists) and fully resolved addresses are shown.

TABLE 1 alias "Smith Jim" smith.jim@companyx.com
alias "Eddie" ejones@companyy.com
alias team Eddie, lisa@bbb.com If the address is fully resolved (i.e., not further resolvable by the local system), the system searches 128 for the alias for the fully qualified address in the user's address book. If the alias exists 130, the alias is added 132 to the alert list of the dialog box 30, in addition to the fully resolved address. The system then checks 136 to see if additional addresses remain in the header that have not been processed. If not, the alert dialog box 30, including the alert message 32, is produced and displayed 138 using conventional dialog box production techniques.

Figure 6:
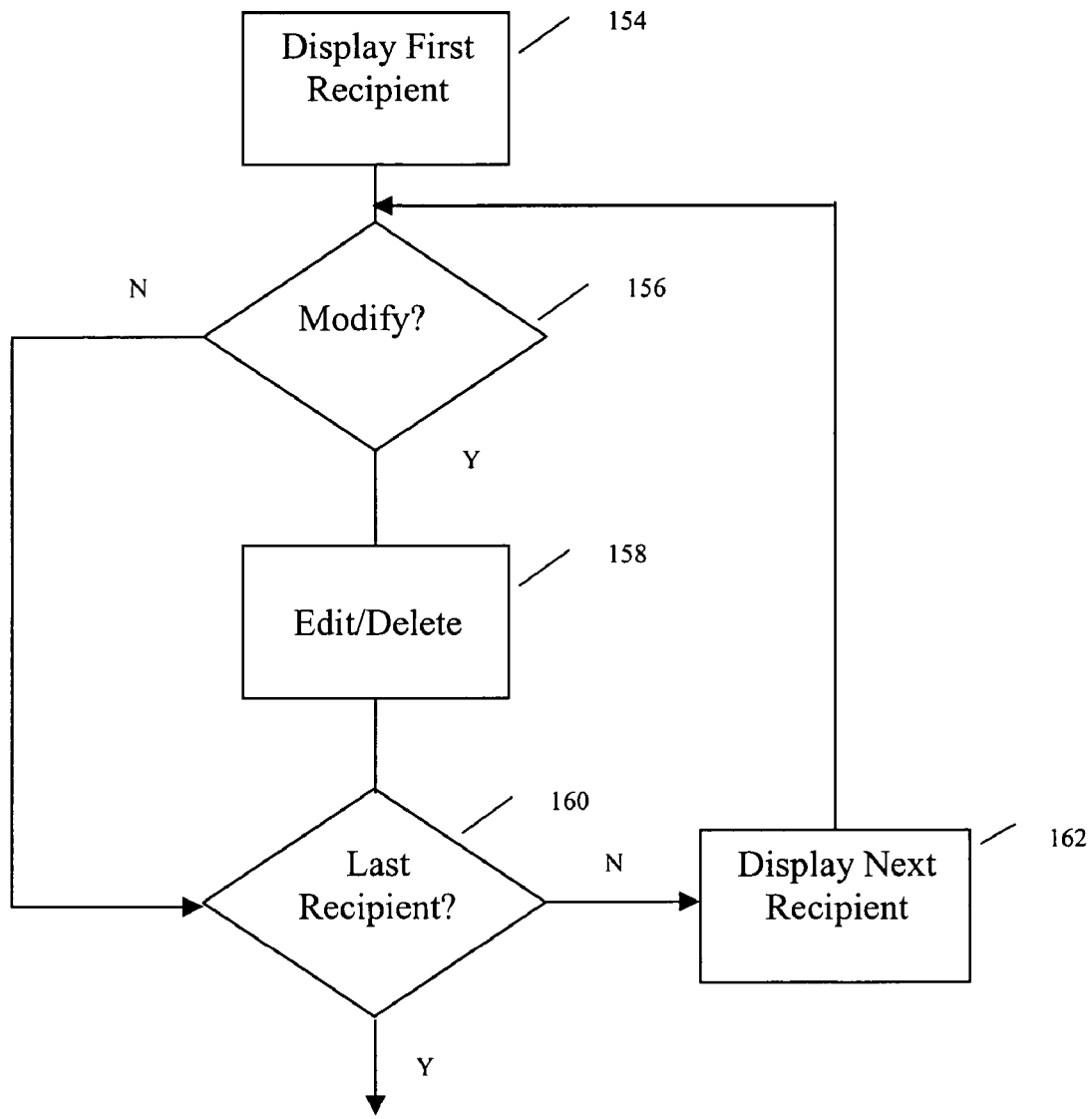
FIG. 6 shows a modify process.

The modify operation 98, as depicted in FIG. 6, begins with the first intended recipient from the message file or buffer being displayed 154. The user is then given the option 156 to modify this addressee. If modification is selected, the user edits or deletes 158 the addressee. When the addressee is deleted, the system removes any delimiters from the header field (such as the comma between addressees in a list) that need to be removed. The list is then examined to determine 160 whether any additional addressees exist and the next is displayed 162 and, if so, the system returns to the modify decision 156.

Electronic mail systems generally come in a number of types. One type are those that are on-line with the mail server such that when messages are sent, the client essentially immediately connects to the mail server and the message is transferred. Another type include those off-line systems that do not immediately send the messages but place them in a queue or out-box to be sent at a later time when a connection to a mail server is possible or specified, such as when an e-mail application is closed. Other types of systems are possible. The particular implementation of the e-mail system with respect to the present invention is not critical as long as an alert, such as the dialog box 30, is presented to the user before the e-mail is sent so the user will have an opportunity to modify the addressees of the e-mail message.

The present invention has been described with respect to providing a modify control that places the system in a state where the user can modify the list of recipients. Alternatively, the user can select a list entry with the pointing device 18, activating a dialog box that will allow modification that includes a delete selection, similar to the way files can be deleted using conventional windows-based operating systems. The system can track messages that have been authorized to be sent by associating an authorization flag with each message or a list of authorized messages.

The present invention has been described with respect to presenting a simple dialog box with an addressee list, however, an audible alert can also be produced, the dialog box can be flashed or an alert color, such as red, can be used. As another alternative, the audible alert can be accompanied by a dialog box that presents the user with the option of reviewing the addressee list or sending the message without reviewing the list. Or, the alert can be an audible or visual warning alone. The invention also applies to messaging systems such as handheld electronic messaging systems, dedicated mail devices and pagers. The invention has been described with controls that allow the user to modify, delete and OK a message after an alert. It is also possible to provide a control that places the message in a queue for later sending after a cooling off period, as specified by the user, has occurred.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An e-mail method, comprising:
   recognizing that an unauthorized electronic mail message is about to be sent from a computing device configured to send an electronic mail message; and
   providing at the computing device an alert indicating that the unauthorized electronic mail message is about to be sent, the alert being provided by a user interface configured to receive as input an instruction for further processing of the unauthorized electronic mail message.

2. The method as recited in claim 1, wherein said recognizing that an unauthorized electronic mail message is about to be sent comprises detecting that a send function has been initiated by an unauthorized agent.

3. The method as recited in claim 2, wherein the unauthorized agent is a virus.

4. The method as recited in claim 1, further comprising stopping transmission of the unauthorized electronic mail message in response to the instruction input via the user interface.

5. The method as recited in claim 1, further comprising deleting the unauthorized electronic mail message, prior to transmission of the unauthorized electronic mail message, in response to the instruction input via the user interface.

6. The method as recited in claim 1, further comprising displaying the unauthorized electronic mail message, and wherein the user interface is configured to receive as input an instruction to modify the unauthorized electronic mail message, cancel transmission of the unauthorized electronic mail message, or authorize transmission of the unauthorized electronic mail message.

7. The method of claim 1, wherein the unauthorized electronic mail is composed by a virus and has a valid recipient address.

8. The method of claim 1, wherein said recognizing that an unauthorized electronic mail message is about to be sent includes detecting that a send operation has been initiated.

9. The method as recited in claim 1, further comprising modifying the addressee of the unauthorized electronic mail message in response to the instruction input via the user interface.

10. The method as recited in claim 1, further comprising modifying a text of the unauthorized electronic mail message in response to the instruction input via the user interface.

11. The method as recited in claim 1, further comprising displaying at least a list of plural addressees of the unauthorized electronic mail message in the user interface, wherein the user interface is configured to receive as input an instruction to modify an addressee in the list of plural addressees.

12. An e-mail method, comprising:
   recognizing that an unauthorized electronic mail message is about to be sent from a computing device configured to send an electronic mail message;
   displaying at least information relating to an addressee of the unauthorized electronic mail message in a user interface configured to receive as input an instruction to stop transmission of the unauthorized electronic mail message; and
   stopping transmission of the unauthorized electronic mail message in response to the instruction input via the user interface.

13. The method of claim 12, wherein the unauthorized electronic mail is composed by a virus and has a valid recipient address.

14. The method of claim 12, wherein said recognizing that an unauthorized electronic mail message is about to be sent includes detecting that a send operation has been initiated.

15. An e-mail method, comprising:
   recognizing that an unauthorized electronic mail message is about to be sent from a computing device configured to send an electronic mail message;
   displaying at least information relating to an addressee of the unauthorized electronic mail message in a user interface configured to receive as input an instruction to delete the unauthorized electronic mail message; and
   deleting the unauthorized electronic mail message, prior to transmission of the unauthorized electronic mail message, in response to the instruction input via the user interface.

16. The method of claim 15, wherein the unauthorized electronic mail message is composed by a virus and has a valid recipient address.

17. The method of claim 15, wherein said recognizing that an unauthorized electronic mail message is about to be sent includes detecting that a send operation has been initiated.

18. An apparatus, comprising:
   a computing device configured to:
      send an e-mail message;
      recognize that an unauthorized e-mail message is about to be sent from the computing device; and
      control a send operation of the unauthorized e-mail message from the computing device responsive to recognizing that the unauthorized e-mail message is about to be sent from the computing device, said control including providing an alert, the alert being provided by a user interface configured to receive as input an instruction for further processing of the unauthorized e-mail message.

19. The apparatus of claim 18, wherein the unauthorized e-mail message is composed by a virus and has a valid recipient address.

20. The apparatus of claim 18, wherein the computing device is configured to detect that a send operation has been initiated and recognize that the unauthorized e-mail message is about to be sent.

21. The apparatus of claim 18, wherein said computing device is configured to control the send operation by stopping transmission of the unauthorized e-mail message, in response to the instruction input via the user interface.

22. The apparatus of claim 18, wherein said computing device is configured to control the send operation by deleting the unauthorized e-mail message, prior to transmission of the unauthorized e-mail message, in response to the instruction input via the user interface.

23. An article of manufacture including a computer readable storage medium having stored thereon computer executable instructions, execution of which by a computing device causes the computing device to perform operations comprising:
   recognizing that an unauthorized electronic mail message is about to be sent from the computing device; and
   controlling a send operation of the unauthorized electronic mail message responsive to recognizing that the unauthorized electronic mail message is about to be sent from the computing device, said controlling a send operation including providing an alert, the alert being provided by a user interface configured to receive as input an instruction for further processing of the unauthorized electronic mail message.

24. The article of manufacture of claim 23, wherein the operations further comprise recognizing the unauthorized electronic mail message is composed by a virus and has a valid recipient address.

25. The article of manufacture of claim 23, wherein said recognizing that an unauthorized electronic mail message is about to be sent includes detecting that a send operation has been initiated.

26. The article of manufacture of claim 23, wherein said controlling a send operation of the unauthorized electronic mail message includes stopping transmission of the unauthorized electronic mail message in response to the instruction input via the user interface.

27. The article of manufacture of claim 23, wherein said controlling a send operation of the unauthorized electronic mail message includes deleting the unauthorized electronic mail message, prior to transmission of the unauthorized electronic mail message, in response to the instruction input via the user interface.

28. An electronic mail message alert display, comprising:
   a text display configured to provide an alert indicating that an unauthorized electronic mail message is about to be sent from a computing device and to display at least information relating to an addressee of the unauthorized electronic mail message; and
   a user interface configured to receive as input an instruction to stop transmission of the unauthorized electronic mail message.

29. The display of claim 28, wherein the text display indicates the unauthorized electronic mail message is composed by a virus and has a valid recipient address.

30. An e-mail method, comprising:
   determining that an unauthorized electronic mail message composed by a virus is about to be sent from a computing device configured to send an electronic mail message; and
   providing at the computing device an alert indicating that the unauthorized electronic mail message is about to be sent, the alert being provided by a user interface configured to receive as input an instruction for further processing of the unauthorized electronic mail message.

31. An e-mail method, comprising:
   determining that an unauthorized electronic mail message about to be sent from a computing device configured to send an electronic mail message is being sent by an unauthorized agent; and
   providing at the computing device an alert indicating that the unauthorized electronic mail message is about to be sent, the alert being provided by a user interface configured to receive as input an instruction for further processing of the unauthorized electronic mail message.

32. An e-mail method, comprising:
   recognizing that an unauthorized electronic mail message composed by a process configured to compose an unauthorized electronic mail message is about to be sent from a computing device configured to send an electronic mail message; and
   providing at the computing device an alert indicating that the unauthorized electronic mail message is about to be sent, the alert being provided by a user interface configured to receive as input an instruction for further processing of the unauthorized electronic mail message.

33. The method as recited in claim 32, wherein the process is a virus.

34. The method as recited in claim 32, wherein the process is an unauthorized agent.

35. The method of claim 32, wherein the unauthorized electronic mail message has a valid recipient address.

36. The method of claim 32, wherein said recognizing that an unauthorized electronic mail message is about to be sent includes detecting that a send operation has been initiated.

37. An e-mail method, comprising:
   recognizing that an electronic mail message about to be sent from a computing device configured to send an electronic mail message is an unauthorized electronic mail message; and
   providing at the computing device an alert indicating that the unauthorized electronic mail message is about to be sent, the alert being provided by a user interface configured to receive as input an instruction for further processing of the unauthorized electronic mail message.

38. The method of claim 37, wherein said recognizing that an unauthorized electronic mail message is about to be sent includes detecting that a send operation has been initiated.

39. An article of manufacture including a computer readable storage medium having stored thereon computer executable instructions, execution of which by a computing device causes the computing device to perform operations comprising:
   recognizing that an electronic mail message about to be sent from a computing device configured to send an electronic mail message is an unauthorized electronic mail message; and
   providing at the computing device an alert indicating that the unauthorized electronic mail message is about to be sent, the alert being provided by a user interface configured to receive as input an instruction for further processing of the unauthorized electronic mail message.

40. The article of manufacture of claim 39, wherein said recognizing that an unauthorized electronic mail message is about to be sent includes detecting that a send operation has been initiated.

41. An e-mail system, comprising:
   means for recognizing that an unauthorized electronic mail message is about to be sent from a computing device configured to send an electronic mail message; and
   means for providing at the computing device an alert indicating that the unauthorized electronic mail message is about to be sent, the alert being provided by a user interface configured to receive as input an instruction for further processing of the unauthorized electronic mail message.

42. The system of claim 41, wherein said means for recognizing that an unauthorized electronic mail message is about to be sent includes means for detecting that a send operation has been initiated.

43. The system of claim 41, further comprising:
   means for stopping transmission of the unauthorized electronic mail message in response to the instruction input via the user interface.

44. The system of claim 41, further comprising:
   means for deleting the unauthorized electronic mail message, prior to transmission of the unauthorized electronic mail message, in response to the instruction input via the user interface.

\* \* \* \* \*